United States Patent [19]

Bell et al.

[11] 4,014,788

[45] Mar. 29, 1977

[54] REMOVING OF BARK FINES FROM AQUEOUS SUSPENSIONS

[75] Inventors: George Richard Bell, Larkspur; Richard Seyb Lamar, Littleton, both of Colo.

[73] Assignee: Johns-Manville Corporation, Denver, Colo.

[22] Filed: May 9, 1975

[21] Appl. No.: 576,079

[52] U.S. Cl. .............................. 210/42 R; 210/60; 210/75; 210/77; 162/1; 162/27

[51] Int. Cl.$^2$ ........................................ C02B 1/20

[58] Field of Search ............. 144/311, 327; 162/1, 162/27, 93; 210/42, 75, 77, 152, 167, 24, 36, 206, 51–53, 60; 241/21, 24; 71/23

[56] References Cited

UNITED STATES PATENTS

| | | | |
|---|---|---|---|
| 2,652,152 | 9/1953 | Frankenhoff | 210/75 |
| 2,845,450 | 7/1958 | Anderson et al. | 71/23 |
| 3,080,971 | 3/1963 | Hutto et al. | 210/75 |
| 3,520,410 | 7/1970 | Hutto | 210/75 |
| 3,752,314 | 8/1973 | Brown et al. | 210/167 |

OTHER PUBLICATIONS

Ass et al., "Purification of Waste Water from Wood Treatment Plants," Chem. Abstracts, 158290b, 1974.

Roden et al., "Treatment and Reuse of Barker Effluents," Chem. Abstracts, 66018h, 1972.

2nd ed., The Pulping of Wood, 1969, pp. 96–99.

*Primary Examiner*—Frank A. Spear, Jr.
*Assistant Examiner*—Peter A. Hruskoci
*Attorney, Agent, or Firm*—Robert M. Krone; Joseph J. Kelly; James W. McClain

[57] ABSTRACT

In the manufacture of wood pulp for use in making paper and other wood fiber products, it is first necessary to remove the bark from the logs. While this can be done using a dry process, a wet process offers many advantages. However, one big disadvantage of the wet process has been the inability to economically remove the bark fines from the water used in the wet process. The present invention provides an economical manner of solving this problem by using a rotary vacuum precoat filter equipped with a rotating knife to remove the bark fines from at least a portion of the recirculating water in a wet debarking process and to avoid long range problems with such a process by adding a small amount of finely divided talc to the bark fines suspension prior to filtration.

10 Claims, No Drawings

REMOVING OF BARK FINES FROM AQUEOUS SUSPENSIONS

The present invention relates to an improved method of wet debarking, and particularly to an improved method of removing bark fines from a recirculating aqueous purge flow in such a process.

BACKGROUND OF THE INVENTION

In the manufacture of wood pulp suitable for use in the paper industry or in the manufacture of other wood fiber containing products one of the first steps involves removing the bark from the logs. This can be done using a dry method in which the bark is removed with a debarking drum and the removed bark fines are collected with conventional dust collection type equipment. Because of economical and environmental problems with the dry debarking process, it is preferred to use a wet debarking process in which the bark fines are removed as an aqueous suspension. All or part of the aqueous suspension is recirculated in the wet debarking process until such time that the solids or bark fines concentration in the suspension become undesirably high. At this point the suspension must be dumped or treated in some manner to reduce the solid content below a tolerable level. The bark fines in the aqueous suspension range in size from sub-micron to approximately ¼ inch long, and can also contain ropy strings of agglomerated particles and/or fibers which are even much longer. This suspension also contains substantial amounts of pitch and resin particles removed from the outer layers of the logs.

One attempt to remove the bark fines from the aqueous suspension in the wet process was to pass the suspension over a conventional water screen to screen out the solids or bark fines from the liquid carrier. This attempt was unsuccessful because the shape of the bark fines particles along with the pitch and resin contained in bark fines resulted in rapid blinding over of the screen, i.e., clogging of the openings in the screens, in such a manner and so seriously that this blinding problem could not be overcome.

Another method presently used to remove the bark fines from the recirculated suspension is to continuously bleed off a portion of the recirculating suspension and replace the amount bled off with fresh water. That portion of the suspension bled off of the system is put into large settling ponds where the higher density solids settle out of the suspension. The liquid carrier, still containing a substantial amount of bark fines, is then fed to a waste water biological treatment plant or activated sludge system for removal of the bark fines and reduction of the biodegradable content to below a suitable level for disposal. This method of removing the bark fines from aqueous suspensions frequently constitutes the major influent loading to waste water biological treatment plants in pulping operations, and is a costly manner for removing the bark fines. In fact, its cost is so significant that it often exceeds the other advantages of the wet process over the dry process of debarking.

An economical manner of solving this problem is to divert at least a portion of the bark fines suspension to a rotary vacuum precoat filter which will remove the bark fines from the suspension producing a filtrate suitable for blending back in with the remainder of the bark fines suspension for recirculation as a purge flow to the debarking operation. This method is described in U.S. Pat. application Ser. No. 576,078 filed on May 9, 1975 in the name of George Richard Bell, the disclosure of which is herein incorporated by reference. While this technique works fine, after a prolonged period of operation the resin and pitch in the bark fines and water foul the equipment and cause partial blinding of the cloth septum whenever one or more cracks develop in the precoat layer.

BRIEF DESCRIPTION OF THE INVENTION

It has now been discovered that the blinding and equipment fouling problem described above can be eliminated by the addition of relatively small amounts of finely divided talc to the bark fines suspension prior to filtration. The talc is preferably a platy talc of minus 400 mesh size and most preferably having an average particle size of about 0.83 microns, a maximum particle size of about 11 microns, a specific gravity of about 2.8 and an oil absorption spatula of about 33 to about 38 pounds per 100 pounds of talc. While the exact amount or concentration of talc in the bark fines suspension will vary somewhat depending upon the concentration and characteristics of the bark fines, a suitable concentration level is about 2 grams of talc per liter of bark fines suspension. Not only does the talc addition control the pitch and resin contained in the bark fines so that it is no longer sticky without apparent adverse effect on filtration rates, but the talc also appears to agglomerate the finest bark particles so that less cake penetration results. This latter phenomenon results in reduced filter aid costs because it permits a reduced rate of knife advance.

DETAILED DESCRIPTION AND PREFERRED EMBODIMENTS

Rotary vacuum precoat filters are well known in the filtration art and therefore will not be described here in detail. Briefly, such filters comprise a rotating drum which usually comprises a perforated metal cylindrical outer surface covered by a permeable septum such as a woven cloth. A series of panels on the interior of the drum are connected to a vacuum source and communicate with the rotating cylindrical surface. To protect the cloth septum from blinding and to provide a filtering medium, an aqueous slurry containing a small amount of filter aid material such as diatomite or perlite is fed to the rotary vacuum filter. The water is drawn to the cloth septum by the vacuum while the filter aid particles suspended therein are deposited on the surface of the cloth as the drum rotates. This process is continued until the desired thickness of filter aid precoat is deposited on the cloth septum. In commercial operation a precoat layer thickness of 2–4 inches would be typical.

After the desired precoat thickness has been obtained the suspension of material desired to be filtered is fed to the rotary filter. The vacuum removes the liquid from the suspension depositing the solids in the suspension on top of the precoat layer. As the drum rotates this layer of solids deposited on top of the precoat layer rotates out of the suspension, the excess water is removed thereby by an extension of the vacuum chamber inside the drum above the suspension level, and finally this layer of solids plus a very thin layer of the precoat filter aid material is removed from the rotating drum a knife blade. In the present invention rotating knife blades are used such as those disclosed in U.S. Pat. No. 3,520,410, the disclosure of which is herein incorporated by reference. The solids and small amounts of filter aid material removed by the rotating knives can be disposed of by various techniques such as land fill or burning, or can be used as a by-product material. These solids can be used as a fuel for a boiler in the production of steam, which can be used to generate electricity. The water drawn through the precoat layer is removed from the rotary vacuum filter and can be either sent to a sewage treatment plant for further reduction of its BOD content, or preferably can be returned to the recirculating bark fine suspension to dilute the bark fines content in the purge flow fed to the wet debarker.

While all of the recirculating aqueous bark fines suspension can be filtered according to the present invention, it is preferable for economical reasons to divert only a portion of the recirculating suspension for filtration while recirculating the remainder back through the wet debarker along with the filtrate from the rotary vacuum filter. By controlling the amount of suspension diverted for filtering, the bark fines solids content and the purge flow bark fines suspension fed to the wet debarker can be maintained below a desirable maximum level.

While any conventional filter aid material suitable for use on a rotary vacuum precoat filter and capable of removing the finest bark fines particles can be used in the present invention, it is preferred to use diatomite filter aid material. Two grades of diatomite that are especially suitable for use in the present invention are those sold under the trademarks HYFLO SUPERCEL and CELITE 512, a flux calcined and a calcined diatomite respectively, available from Johns-Manville.

The best filter aid material to use in any particular situation may vary because of the type or particle size distribution of the bark fines, and it is within the ordinary skill of the art to determine without undue experimentation the best filter aid material to use for any particular particle size influent.

While the above described process is a suitable technique for removing bark fines from a bark fines suspension, prolonged filtration of this material results in a sticky, gummy deposit on the septum and on the interior surfaces of the rotary vacuum filter which must be periodically removed by a solvent or some other suitable means to prevent deterioration in the filtration rate through the filter. Furthermore, if the filter cake should develop one or more cracks therein, the septum becomes rapidly blinded in the area adjacent to the crack by the pitch and resin particles in the bark fines suspension. This blinding seriously reduces the filtration rate through the filter requiring filtration to be shut down and the septum cleaned or replaced.

It has been discovered that adding a relatively small amount of finely divided talc particles to the bark fines suspension prior to filtration eliminates these problems.

The finely divided talc particles are preferably platy in shape and minus 400 mesh in size. Most preferably the particles have an average particle size of less than one micron as determined by a FISHER SUBSIEVE SIZER with a maximum particle size of no more than about 11 microns.

The amount of talc particles added to the bark fines suspension will depend upon the concentration of the bark fines in the suspension and the type of wood making up the bark fines, i.e., the amount of sticky pitch and resin particles in the bark fines and the suspension.

Test work has indicated that about 2–10 weight percent of talc, based on the weight of dry bark fines in the suspension, and preferably about 5–10 weight percent, will produce successful results. When working with typical bark fines suspensions containing about 0.35 weight percent bark fines solids on a dry basis, the bark fines being typical pulp wood fines, suitable concentrations of talc particles fall in the range between about 0.35 grams talc per gallon of suspension to about 2 grams of talc per gallon of suspension. As the concentration of the bark fines in the suspension increases and/or as the concentration of sticky pitch and resin particles in the suspension increases the concentration of platy talc particles added to the suspension should also be increased. Correspondingly, the concentration of talc particles in the suspension can be decreased as the bark fines concentration and/or the concentration of sticky pitch and resin particles in the suspension decrease.

The following example illustrates the presently claimed invention and the advantages thereof.

EXAMPLE

An aqueous suspension of bark fines having a solids content of about 0.4 weight percent, on a dry basis and containing about 2 weight percent of CYCLO-SORB talc, based on the dry weight of bark fines in the suspension, was filtered using a Dorr-Oliver pilot plant size rotary vacuum precoat filter whose drum measured 36 inches in diameter and had a 6 inch wide filtering surface. CYCLO-SORB talc is a platy talc having an average particle size of about 0.8 microns available from Johns-Manville. First, a 2 inch thick precoat layer of diatomite filter aid was built up on the rotating drum in a conventional manner. The bark fines in the aqueous suspension ranged in size from sub-micron size to approximately ¼ of an inch in screen size. The rotary vacuum filter was equipped with a rotating knife cake removal device such as that disclosed in FIGS. 2–4 and 9 of U.S. Pat. No. 3,520,410, the disclosure of which is herein incorporated by reference. The drum was rotated at a speed of about 2 minutes per revolution while the 6 inch diameter rotating blade cutter was rotated in a counter direction at a speed of about 1200 RPM. The blade was moved towards the surface of the filtering drum at a rate designed to remove the precoat layer at a rate of about 12 hours per inch of precoat layer.

Under the above conditions the bark fines were removed from the bark fines suspension, producing a filtrate suitable for blending into the recirculation system in a wet debarking operation. A sample of the bark fines and a sample of the liquid filtrate were removed from the system and tested by the standard method for measuring BOD. At the end of five days the BOD level in the bark fines was 2500 PPM while the BOD level in the liquid filtrate was only 1150 PPM. Thus, if the liquid filtrate were to be fed to a waste water biological treatment system, the pollution level of the influent would be less than half of that of the bark fines that normally is included in the bark fines suspension fed to such treatment plants. A more significant advantage though is the fact that the liquid filtrate can be recirculated back to the wet debarking purge flow system eliminating or greatly diminishing the need for any waste water treatment for the wet debarking operation. Also, this greatly reduces the need for makeup water for this type of operation.

Similar tests on bark fines suspensions having a solids content ranging from as low as 0.2 weight percent to as high as 5.34 weight percent, on a dry solids basis, produced similarly good results.

In describing the invention certain embodiments have been used to illustrate the invention and the process thereof. However, the invention is not limited to these specific embodiments and modifications within the spirit of the invention will readily occur to those skilled in the art on reading this specification. The invention is thus not intended to be limited to the specific embodiments disclosed, but instead is to limited only by the claims appended hereto.

We claim:

1. In a hydraulic process for removing bark from logs which comprises removing the bark from the logs in the form of bark fines and flushing the bark fines away from the logs with water, such that an aqueous suspension of bark fines is formed, the improvement which comprises:

removing essentially all of said bark fines from said aqueous suspension by filtering said suspension with a rotary vacuum filter, wherein there is deposited on the outer surface of the drum of said rotary vacuum filter a filter aid layer comprising diatomite, and wherein said rotary vacuum filter also has rotating blade means for removing the layer of bark fines which is deposited on the surface of said filter aid layer, and wherein platy talc particles are added to said aqueous suspension prior to the filtration of said suspension, said talc particles being present in a concentration of about 2 to 10 weight percent talc based on the weight of dry bark fines in said suspension.

2. The improvement as defined in Claim 1 wherein said platy talc particles are added to said suspension in an amount dependent upon the concentration of bark fines in said suspension and the concentration of sticky pitch and resin particles in said suspension.

3. The improvement as defined in claim 2 wherein the amount of platy talc particles added to said suspension is equivalent to an amount in the range of about 0.35 grams to about 2 grams per gallon of bark fines suspension containing 0.35% bark fines solids, on a dry weight basis.

4. The improvement as defined in claim 2 wherein said filter aid layer comprises diatomite having a particle size distribution capable of removing the smallest particles of bark fines from the liquid.

5. The improvement as defined in claim 2 wherein the filtered liquid is reused in the flushing step.

6. The improvement defined in claim 5 wherein a first portion of the liquid suspension containing the bark fines is filtered and a second portion is reused in the flushing step after having been blended with the filtrate from the first portion.

7. The improvement defined in claim 6 wherein the amount of said first portion is adjusted relative to the total amount of said first and second portions to maintain the bark fines concentration in said blend below a desired level.

8. The improvement defined in claim 4 wherein the bark fines comprise particles as large as ¼ inch long and as small as less than one micron in diameter.

9. The improvement as defined in claim 1 wherein said platy talc particles have an average particle size of less than one micron.

10. The improvement as defined in claim 1 wherein substantially all of said platy talc particles pass through a 400 mesh screen.

* * * * *